May 18, 1926.

F. W. BRACKETT

SCREENING APPARATUS

Filed March 26, 1925     6 Sheets-Sheet 1

1,585,461

Inventor
Francis Whytwell Brackett
By
James L. Norris
Attorney

May 18, 1926.
F. W. BRACKETT
1,585,461
SCREENING APPARATUS
Filed March 26, 1925     6 Sheets-Sheet 2
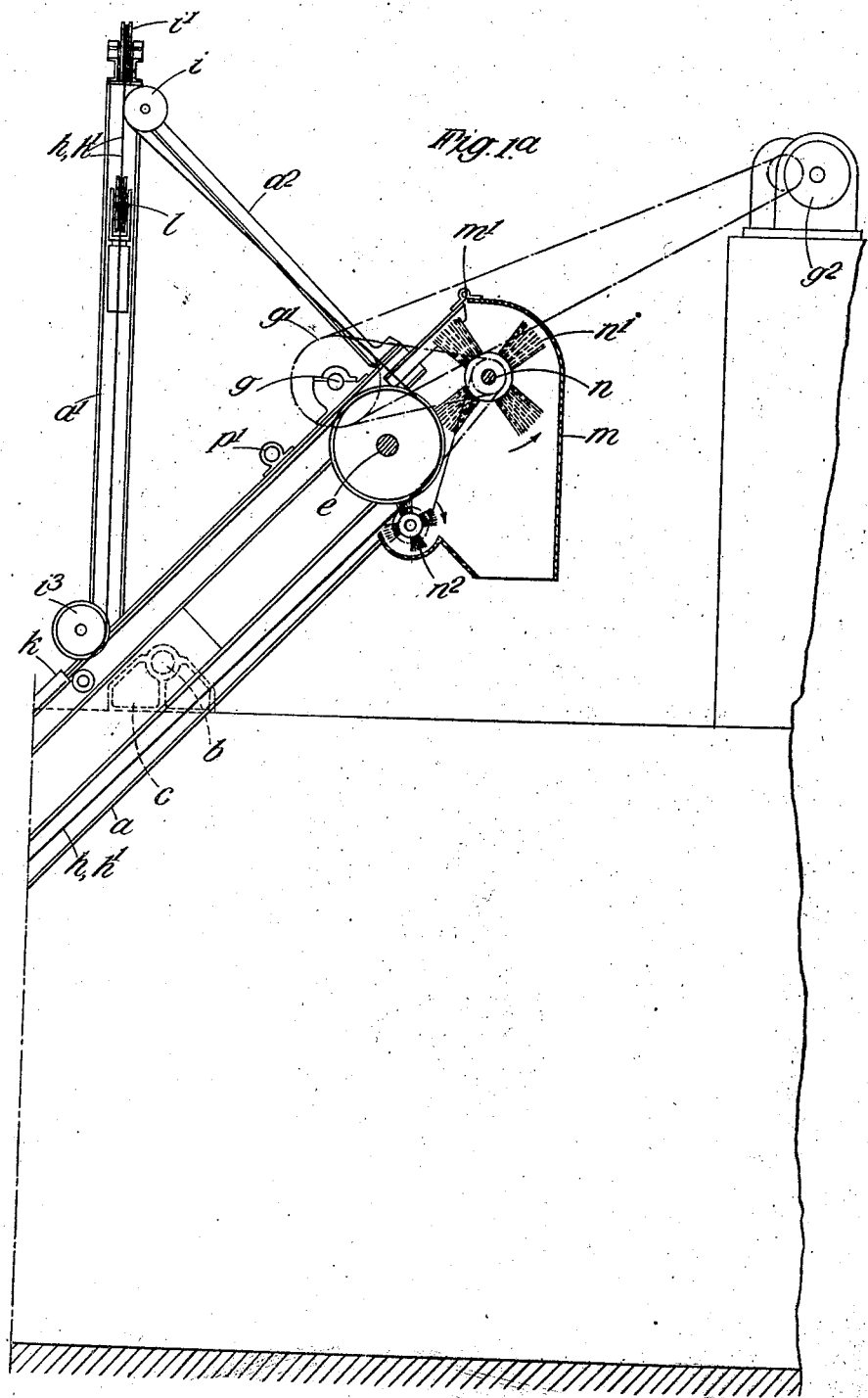

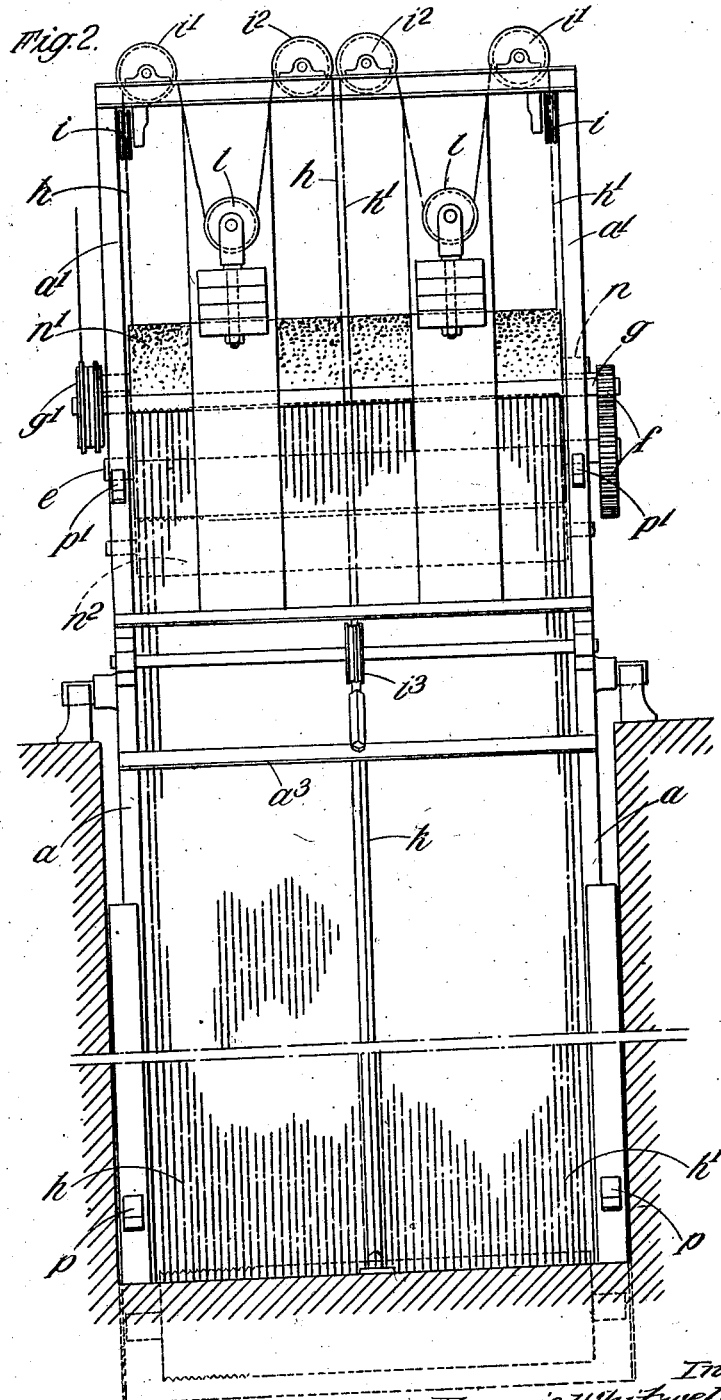

May 18, 1926.　　　　　F. W. BRACKETT　　　　1,585,461
SCREENING APPARATUS
Filed March 26, 1925　　6 Sheets-Sheet 4
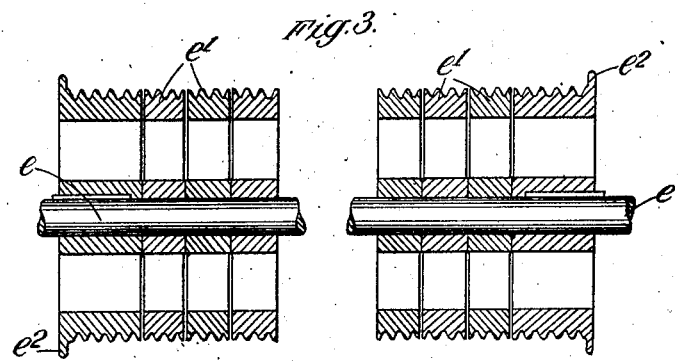
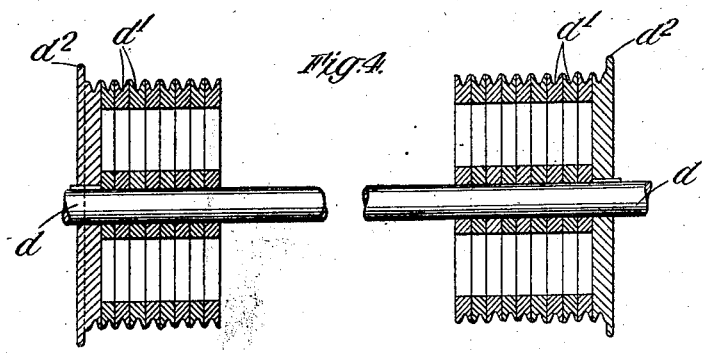
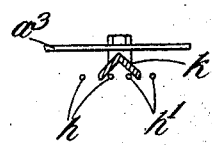

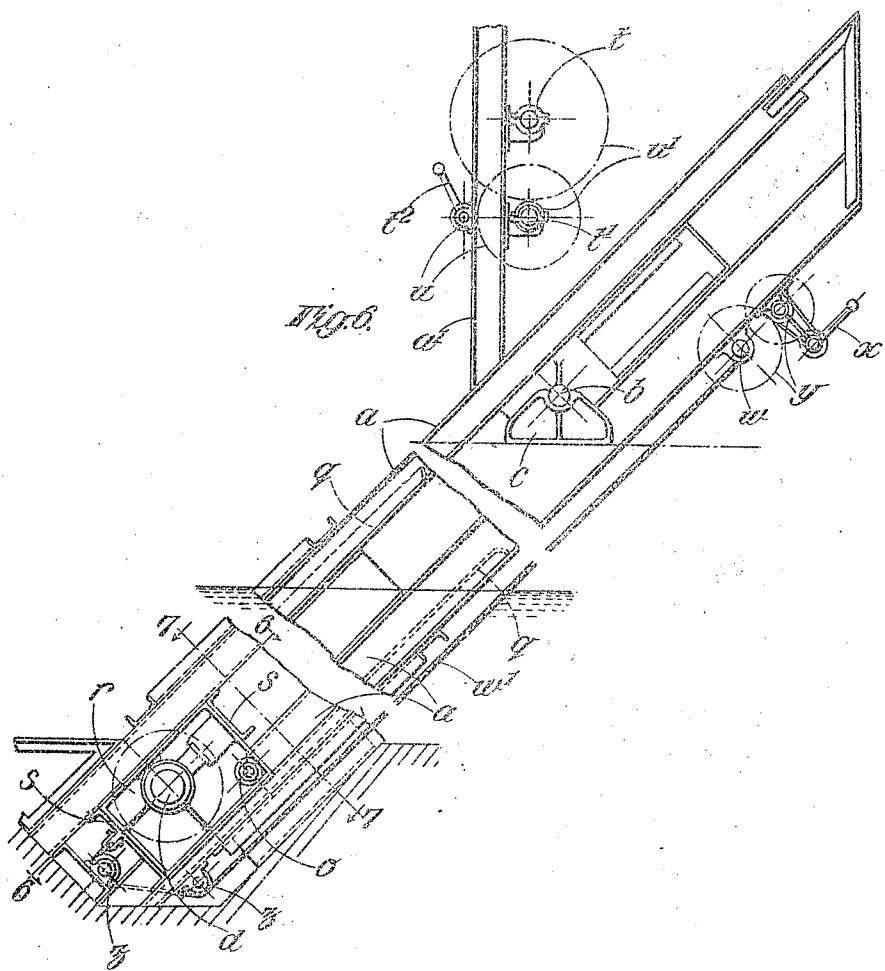

May 18, 1926.
F. W. BRACKETT
SCREENING APPARATUS
Filed March 26, 1925    6 Sheets-Sheet 6
1,585,461
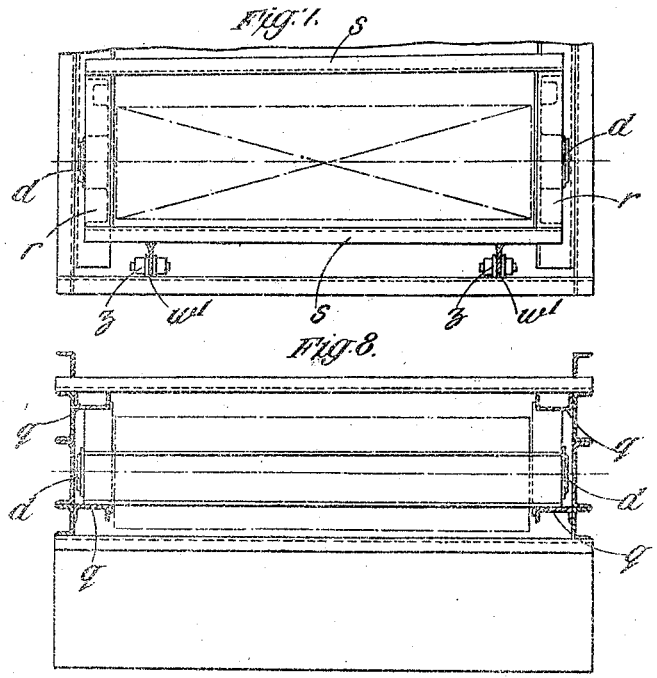
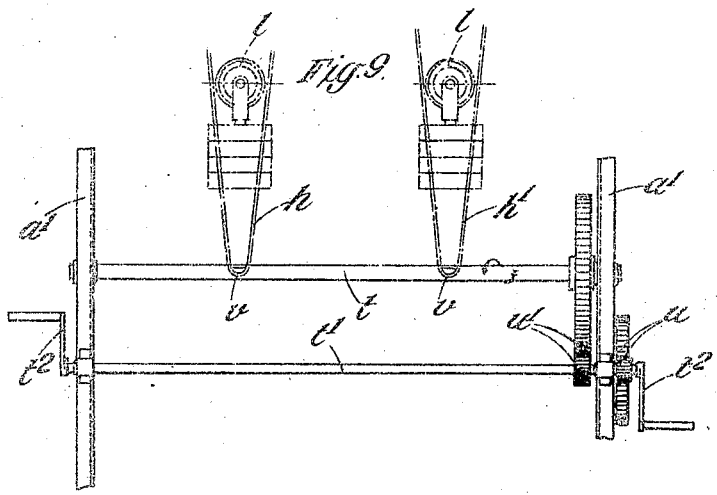
Inventor
Francis Whitwell Brackett
By
Attorney Patented May 18, 1926.

1,585,461

UNITED STATES PATENT OFFICE.

FRANCIS WHITWELL BRACKETT, OF COLCHESTER, ENGLAND.

SCREENING APPARATUS.

Application filed March 26, 1925. Serial No. 18,530.

My invention relates to apparatus for screening or filtering water or other liquid containing solid matter in suspension, or for sieving or screening more or less dry solid material, of the kind in which the screen is an endless band that travels over a drum.

One object of the invention is to obtain a more efficient screening than is afforded by known apparatus; another is to construct a screen of this kind which can be cleaned easily while in operation and will offer less resistance to the passage of water than that offered by known screens of the kind. Another object is to construct a screen of this type which shall be economical in respect of cost of upkeep and consumption of power.

With these and other objects I have constructed a screen comprising a continuous rope or its equivalent travelling over drums in such a manner that it forms parallel lengths close enough to each other to prevent passage between them of the material to be filtered.

This construction and the features of my invention will be understood clearly from the following description with reference to the accompanying drawings in which—

Figs. 1 and 1ª read together show a section through a sump containing a screen constructed according to my invention.

Fig. 2 is a front elevation of the screen.

Fig. 3 is an axial section through the upper drum of the screen, drawn to an enlarged scale.

Fig. 4 is a like section through the lower drum.

Fig. 5 is a sectional detail view, also drawn to an enlarged scale.

Fig. 6 is a side elevation of a modified form of the screen.

Fig. 7 is a section on line 6—6 of Fig. 6.

Fig. 8 is a section on line 7—7 of Fig. 7.

Fig. 9 is a detail view in elevation drawn to an enlarged scale.

Figure 1:
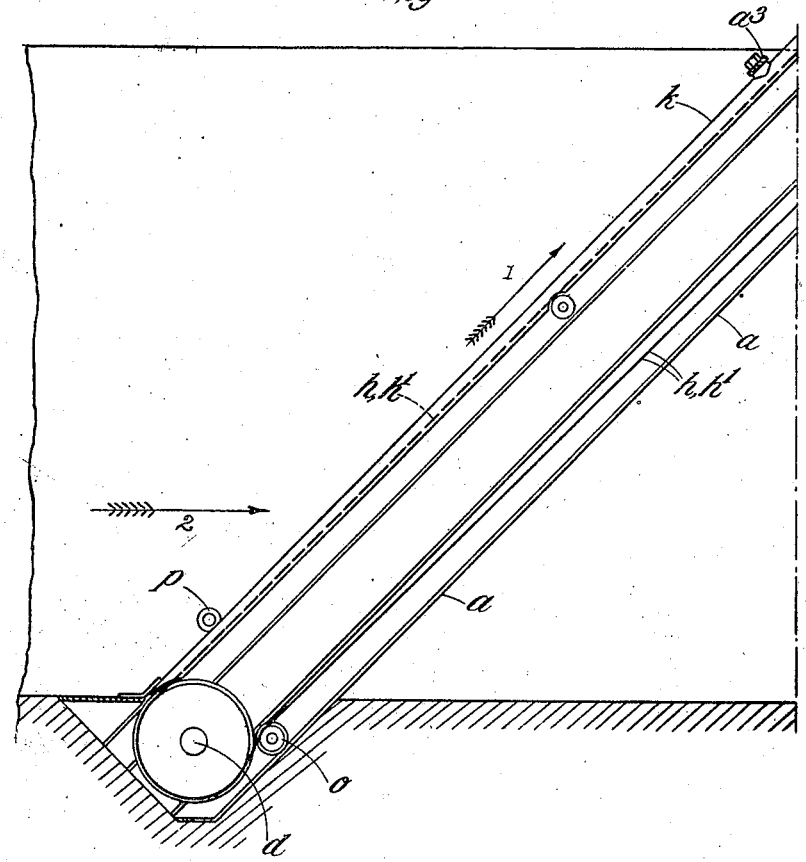

The frame $a$ is mounted by trunnions $b$ in bearings $c$ and rests on the bottom of the sump in an inclined position, its angle of inclination being smaller than the angle of repose of the material which is to be carried out of the sump by the travel of the screen in the direction of the arrow, Fig. 1. The flow of the water in the sump is indicated by the arrow 2.

In the lower part of the frame is journalled a shaft $d$ which carries the lower drum (Fig. 4) composed of a number of grooved pulleys $d'$ mounted on the shaft and free to turn independently thereof and of each other, the two end pulleys being preferably keyed to the shaft and having outside flanges $d^2$.

In the upper part of the frame $a$ is journalled the shaft $e$ of a drum (Fig. 3) having peripheral grooves corresponding in number and pitch with the grooves of the pulleys $d'$. This drum is preferably composed of a number of pulleys $e'$ mounted on the shaft and free to turn independently thereof and of each other, the two end pulleys being keyed to the shaft and preferably of somewhat greater width than the intermediate pulleys; these pulleys have outside flanges $e^2$. It will be noted that each pulley carries more than one groove. In the form illustrated the number of grooves is three for each of the intermediate pulleys and five for the end pulleys. This use of a number of grooves on each pulley contributes to the smooth running of the screen. The shaft $e$ is driven through gear $f$ by a shaft $g$, itself driven through pulley $g'$ by a suitable motor $g^2$.

The screening surface is made by winding a continuous length of wire rope or the like in the grooves of pulleys $d'$ and $e'$. In the case illustrated two such ropes $h$ and $h'$ are used on account of the considerable width of the screen. The rope is selected of somewhat greater length than is needed and after it has been wound, its connected ends are formed into a bight in which is suspended a weighted pulley. This keeps the rope taut and the construction for the purpose here illustrated comprises a vertical frame $a'$ erected on frame $a$ and suitably stayed by bars $a^2$. This frame $a'$ carries pulleys $i, i', i^2, i^3$. As already stated, there are two ropes $h, h'$, so that the pulleys $i, i', i^2$ and $i^3$ are duplicated as shown in Fig. 2. The rope having been wound, the end which has left the groove of a pulley $d'$ passes beneath an angle iron $k$ (whose purpose will presently be explained) which is bolted to transverse member $a^3$ of frame $a$ and then passes around pulleys $i^3$ and $i^2$ to meet the other end which has left the groove next to one of the flanges $e^2$ and has passed around pulleys $i$ and $i'$. The two ends are united to form a bight in which is suspended the weighted pulley $l$.

At its upper end the frame $a$ carries on a hinge $m'$ a hood-shaped hopper $m$ within which is a brush $n'$ fixed to a shaft $n$ suitably journalled in frame $a$. The shaft $n$ is driven, in the direction indicated by an arrow in Fig. 1ª, from the pulley $g'$ on shaft $g$, and the brush $n$ brushes from pulleys $e'$ the matter carried by the lengths of rope as they pass round the pulleys. This removal of matter is aided by the fact that the grooves of the pulleys $e'$ are deeper than the diameter of the rope, so that matter adhering to two or more lengths of the latter is loosened as it passes over the drum. To complete the cleansing operation the hood $m$ contains a second brush $n^2$ which is also carried on a shaft journalled in frame $a$. This shaft is driven from shaft $n$ by a belt as indicated, in the direction of the arrow (Fig. 1ª). It will be seen that this second brush brushes the pulleys before the rope comes again in contact with them in the course of a revolution. The two lengths of rope $h$, $h'$, which are seen in the middle of Fig. 2, pass, as already explained, over pulleys $i^3$, $i^2$ before they can be brushed by brush $n'$; hence it is advantageous to keep them free from deposited matter and it is for this purpose that they travel beneath the angle iron $k$ as already explained.

To ensure correct engagement of the lengths of the rope with the grooves of pulleys $d'$, there is mounted to rotate in bearings carried by frame $a$, a roller $o$ (Fig. 1) grooved correspondingly with the several pulleys $d'$ and situated close to the latter so as to engage the several lengths of rope just before they enter the pulley grooves.

The eyes $p$, $p'$ on the frame $a'$ permit of the screen being removed entirely from the sump by means of attached tackle; or the screen may be turned on its trunnions by attaching the tackle to eyes $p$ only, so that the lower part of the screen can be raised from the sump for inspection or repair.

In the modification shown in Figs. 5—9, the shafts $d$ and roller $o$ are carried in a frame separate from the frame $a$ and which is adapted to slide in the latter. This construction makes it possible to raise the pulleys $d'$ from the water for inspection or repair without application of tackle as will be seen from the following description:—To the sides of the frame $a$ are fixed the trough girders $q$ which extend to such a distance from the lower end of the frame that they terminate above low water level. The bearings of shaft $d$ and the roller $o$ are mounted in rectangular castings $r$ adapted to slide between the girders $q$ and are held rigidly together by girders $s$. On the vertical frame $a'$ are journalled shafts $t$ and $t'$ and the crank $t^2$. The latter drives shaft $t'$ through gear $u$ and shaft $t'$ drives shaft $t$ through gear $u'$. Shaft $t$ carries two lugs $v$ to which the bights of the ropes $h$ and $h'$, after removal of the weighted pulleys, can be attached. When the shaft $t$ is rotated, the ropes $h$ and $h'$ are wound up on it and the tension on the ropes pulls the lower drum and the frame that carries it along the guides formed by girders $q$, so that the drum is brought above the surface of the water. The rear girder $s$ of the frame which carries the lower drum shaft $d$ is attached by ropes $w'$ to a shaft $w$ journalled on the underside of frame $a$ and adapted to be rotated by crank $x$ through gear $y$, the ropes being guided by pulleys $z$ carried by frame $a$. When crank $t^2$ has been released, the frame which carries the shaft $d$ can be returned to normal position by winding the ropes $w'$ on shaft $w$.

Having thus fully described the nature of my said invention and the best means I know of carrying the same into practical effect, I claim:—

1. Screening apparatus of the kind described comprising a frame, an upper shaft and a lower shaft mounted in the frame, peripherally grooved pulleys mounted free on the upper shaft, at least one peripherally grooved pulley keyed to the upper shaft, peripherally grooved pulleys mounted free on the lower shaft and a continuous rope wound in the grooves of the pulleys of both shafts to form an endless band consisting of parallel lengths of rope.

2. Screening apparatus of the kind described comprising a frame, an upper shaft and a lower shaft mounted in the frame, a number of pulleys each having more than one peripheral groove mounted free to turn on the upper shaft at least one peripherally grooved pulley keyed to the upper shaft, a number of pulleys free to turn on the lower shaft and a continuous rope wound in the grooves of the pulleys of both shafts so as to form an endless band consisting of parallel lengths of rope.

3. Screening apparatus of the kind described comprising a frame, an upper shaft and a lower shaft mounted in the frame, a number of peripherally grooved pulleys mounted free to turn on the upper shaft, each pulley having more than one peripheral groove, at least one peripherally grooved pulley having more than one groove keyed to the upper shaft, a number of grooved pulleys each having one peripheral groove mounted free on the lower shaft and a continuous rope.

4. Screening apparatus of the kind described comprising a frame, an upper shaft and a lower shaft mounted in the frame, a number of peripherally grooved pulleys mounted free to turn on the upper shaft, each pulley having more than one peripheral groove, at least one peripherally grooved pulley having more than one groove keyed to the upper shaft, a number of grooved pulleys each having one peripheral groove mounted free on the lower shaft, at least one grooved pulley keyed to the lower shaft and a continuous rope.

5. Screening apparatus of the kind described comprising a frame, an upper shaft and a lower shaft mounted in the frame, peripherally grooved pulleys mounted free on the upper shaft, at least one peripherally grooved pulley keyed to the upper shaft, peripherally grooved pulleys mounted free on the lower shaft, a continuous rope wound in the grooves of the pulleys on both shafts so as to form an endless band consisting of parallel lengths of rope, the said rope being longer than is necessary to fill all the grooves, guides carried by the frame to cause the excess length of rope to depend as a bight and means for applying tension to the said bight.

6. Screening apparatus of the kind described comprising a frame, an upper shaft and a lower shaft mounted in the frame, a number of pulleys mounted on the upper shaft, the end pulleys being keyed to the shaft while the intermediate pulleys are mounted free thereon, the said end pulleys having each five peripheral grooves and the said intermediate pulleys having each three peripheral grooves, a number of single grooved pulleys mounted on the lower shaft, the said end pulleys being keyed to the shaft while the said intermediate pulleys are mounted to turn thereon, a continuous rope wound in the grooves of the pulleys on both shafts so as to form an endless band consisting of parallel lengths of rope, the said rope being longer than is necessary to fill all the grooves, guides carried by the frame to cause the excess length of rope to depend as a bight and means for applying tension to the said bight.

7. Screening apparatus of the kind described comprising a frame, an upper shaft and a lower shaft mounted in the frame, peripherally grooved pulleys mounted free on the upper shaft, at least one peripherally grooved pulley keyed to the upper shaft, peripherally grooved pulleys mounted free on the lower shaft, a continuous rope wound in the grooves of the pulleys on both shafts so as to form an endless band consisting of parallel lengths of rope, the said rope being longer than is necessary to fill all the grooves, guides carried by the frame to cause the excess length of rope to depend as a bight and a weighted pulley suspended in said bight.

8. Screening apparatus of the kind described comprising a frame, an upper shaft and a lower shaft mounted in the frame, peripherally grooved pulleys mounted free on the upper shaft, at least one peripherally grooved pulley keyed to the upper shaft, peripherally grooved pulleys mounted free on the lower shaft, a continuous rope wound in the grooves of the pulleys on both shafts so as to form an endless band consisting of parallel lengths of rope, the said rope being longer than is necessary to fill all the grooves, a vertical frame erected on the aforesaid frame, guide pulleys carried by the said vertical frame to cause the excess length of rope to depend as a bight and a weighted pulley suspended in the bight.

9. Screening apparatus of the kind described comprising a frame, an upper shaft and a lower shaft mounted in the frame, peripherally grooved pulleys mounted free on the upper shaft, at least one peripherally grooved pulley keyed to the upper shaft, peripherally grooved pulleys mounted free on the lower shaft, a continuous rope wound in the grooves of the pulleys of both shafts to form an endless band consisting of parallel lengths of rope, a hood forming a hopper at the upper end of the frame, and a positively rotated brush within said hood and adapted to brush matter from the upper drum at a part where the rope is not in contact with it.

10. Screening apparatus of the kind described, comprising a frame, an upper shaft and a lower shaft mounted in the frame, peripherally grooved pulleys mounted free on the upper shaft, at least one peripherally grooved pulley keyed to the upper shaft, peripherally grooved pulleys mounted free on the lower shaft, a continuous rope wound in the grooves of the pulleys on both shafts so as to form an endless band consisting of parallel lengths of rope, the said rope being longer than is necessary to fill all the grooves, a vertical frame erected on the aforesaid frame, guide pulleys carried by the said vertical frame to cause the excess length of rope to depend as a bight, a weighted pulley suspended in the bight and means for preventing deposit of matter on that portion of the length of the rope which passes over the guide pulleys.

11. A screen of the kind described comprising a lower grooved drum, an upper grooved drum, a continuous rope wound in the grooves of the two drums and a roller grooved correspondingly with the lower drum and adapted to rotate in close proximity with the lower drum to maintain the rope in the grooves of the drum.

12. Screening apparatus comprising a frame, a lower grooved drum and an upper grooved drum mounted to rotate in the frame, a continuous rope wound on the two drums to form an endless band consisting of parallel lengths of rope, bearings for the lower drum adapted to slide in the said frame and means for putting tension on the said rope so that the said bearings slide up the frame carrying with them the drum.

13. Screening apparatus comprising a main frame, guides within it, a subsidiary frame adapted to slide in the said guides, an upper grooved drum mounted to rotate in the main frame, a lower grooved drum mounted to rotate in the subsidiary frame, a continuous rope wound on the two drums and of length greater than needed to fill the drums, and means for winding up this excess length, for the purpose set forth.

14. Screening apparatus comprising a main frame, guides within it, a subsidiary frame adapted to slide in the said guides, an upper grooved drum mounted to rotate in the main frame, a lower grooved drum mounted to rotate in the subsidiary frame, a continuous rope wound on the two drums and of length greater than needed to fill the drums, a vertical frame carried by the said main frame, pulleys mounted on the said vertical frame, a bight of rope formed by the said continuous rope passing over the said pulleys, a shaft mounted in the said vertical frame and adapted to be rotated, means on the shaft for engaging the said bight and means for rotating the shaft to wind the said rope thereon.

15. Screening apparatus comprising the features referred to in claim 14 and also means for pulling the subsidiary frame downwards in the main frame and for anchoring it thereto.

In testimony whereof I have signed my name to this specification.

FRANCIS WHITWELL BRACKETT.